(12) United States Patent
Leiber et al.

(10) Patent No.: US 11,279,337 B2
(45) Date of Patent: Mar. 22, 2022

(54) DIAGNOSTIC METHOD FOR AT LEAST ONE COMPONENT OF A MOTOR VEHICLE

(71) Applicant: IPGATE AG, Pfäffikon (CH)

(72) Inventors: Heinz Leiber, Oberriexingen (DE); Thomas Leiber, Rogoznica (HR); Anton Van Zanten, Ditzingen (DE)

(73) Assignee: IPGATE AG, Pfäffikon (CH)

( * ) Notice: Subject to any disclaimer, the term of this patent is extended or adjusted under 35 U.S.C. 154(b) by 124 days.

(21) Appl. No.: 16/316,425

(22) PCT Filed: Jul. 4, 2017

(86) PCT No.: PCT/EP2017/066653
§ 371 (c)(1),
(2) Date: Jan. 9, 2019

(87) PCT Pub. No.: WO2018/011021
PCT Pub. Date: Jan. 18, 2018

(65) Prior Publication Data
US 2019/0299962 A1 Oct. 3, 2019

(30) Foreign Application Priority Data
Jul. 14, 2016 (DE) .................... 10 2016 112 971.2

(51) Int. Cl.
*B60T 17/22* (2006.01)
*B60T 8/40* (2006.01)

(52) U.S. Cl.
CPC .......... *B60T 17/222* (2013.01); *B60T 8/4072* (2013.01); *B60T 17/226* (2013.01); *B60T 2270/403* (2013.01); *B60T 2270/406* (2013.01)

(58) Field of Classification Search
CPC .... B60T 17/222; B60T 17/226; B60T 8/4072; B60T 2270/403; B60T 2270/406; B60Y 2400/81
See application file for complete search history.

(56) References Cited

U.S. PATENT DOCUMENTS 3,882,959 A * 5/1975 Hsieh ............. B60T 17/16
180/287
6,631,636 B1 * 10/2003 Schleicher ........... B60T 17/221
73/121

(Continued)

FOREIGN PATENT DOCUMENTS

CN 103140399 A 6/2013
DE 102009055721 A1 6/2011

(Continued)

OTHER PUBLICATIONS

Breuer, B., Bremsenhandbuch, pp. 434-436 (2012).

(Continued)

*Primary Examiner* — Michael V Kerrigan
(74) *Attorney, Agent, or Firm* — Panitch Schwarze Belisario & Nadel LLP

(57) ABSTRACT

A diagnostic method, in particular to determine the leak tightness of at least one seal and/or one valve, for at least one component of a vehicle, wherein a piston cylinder unit, whose piston is driven by an electromotive drive, forms a pressure supply unit, wherein a control unit identifies the piston position and/or piston movement of the piston by means of at least one sensor and the pressure generated by the pressure supply unit or the motor current flowing through the drive by means of at least one sensor. During the diagnostic method, the control unit may be used to measure quantities relating to piston movement/position, pressure, and/or pressure variation.

17 Claims, 3 Drawing Sheets

(56) References Cited

U.S. PATENT DOCUMENTS

2005/0126265 A1* 6/2005 Herzog .............. G01M 3/3236
                                                      73/49.2
2013/0218407 A1* 8/2013 Jungbecker ........... B60T 7/042
                                                      701/34.4

FOREIGN PATENT DOCUMENTS

| DE | 102011081240 A1 | 4/2012 |
| DE | 102011085273 A1 | 5/2012 |
| DE | 102011087182 A1 | 6/2012 |
| DE | 102012201535 A1 | 10/2012 |
| DE | 102011112515 A1 | 2/2013 |
| DE | 102012221770 A1 | 11/2013 |
| DE | 102014109384    | 7/2014 |
| DE | 102013210563 A1 | 12/2014 |
| DE | 102013111974 A1 | 4/2015 |
| DE | 102013018072 A1 | 6/2015 |
| DE | 102014117726 A1 | 6/2016 |
| EP | 1874602 A1      | 1/2008 |
| EP | 3046815 B1      | 7/2016 |
| JP | H10132696 A     | 5/1998 |
| JP | H10507512 A     | 7/1998 |
| JP | 2005344865 A    | 12/2005 |
| WO | 1997005395 A1   | 2/1997 |
| WO | 2006111393 A1   | 10/2006 |
| WO | 2014195092 A1   | 12/2014 |
| WO | 2015036601 A2   | 3/2015 |
| WO | 2015036623 A2   | 3/2015 |

OTHER PUBLICATIONS

International Search Report dated Oct. 17, 2017 in International Application No. PCT/EP2017/066653.
Written Opinion dated Oct. 17, 2017 in International Application No. PCT/EP2017/066653.
Office Action dated Mar. 6, 2017 in German Appliction No. 10 2016 112 971.2 (No. Translation, shown for relevance).
Office Action dated Nov. 19, 2020 in Chinese Application No. 201780043741.
Office Action dated May 31, 2021 in Japanese Application No. 2019-501669 (No. Translation, included for relevance).
Office Action dated Sep. 24, 2021 in Korean Application No. 1020197004313.

* cited by examiner

DIAGNOSTIC METHOD FOR AT LEAST ONE COMPONENT OF A MOTOR VEHICLE This application is a U.S. national-stage application, under 35 U.S.C. § 371, of PCT International Patent Application No. PCT/EP2017/066653, filed on Jul. 4, 2017, which claims priority from Application 10 2016 112 971.2, filed on Mar. 21, 2016 in Germany. The entire contents of these applications are incorporated herein by reference in their entirety.

The invention relates to a diagnostic method, in particular to determine the leak tightness of at least one seal and/or one valve, for at least one component of a vehicle, a piston cylinder unit, whose piston is driven by an electromotive drive, forming a pressure supply unit, a control unit identifying the piston position and/or piston movement of the piston by means of at least one sensor and the pressure generated by the pressure supply unit or the motor current flowing through the drive by means of at least one sensor.

PRIOR ART

Pressure regulating methods for hydraulic dynamic driving systems according to the prior art are described in detail in the Brake Handbook (4th Edition, Bert Breuer, Karlheinz Bill, Springer Vieweg) on pages 434 et seq.

According to the prior art, so-called return systems are used in conventional ABS/ESP systems (Image 20.12 Brake Handbook page 434). The pressure regulation takes place via a time control of the inlet and outlet valves during the regulating operation (ABS operation). In order to improve the pressure regulation, the valves are controlled by pulse width modulation (PWM). This classic method is very complex and requires very accurate models since numerous non-linear effects, such as e.g. coil temperature, pressure difference, viscosity, tolerances of the valves and the pressure level in the regulation have to be represented during the time control. Generally, a pump is used as the pressure source, which mainly delivers a constant primary pressure, which depends on the foot force and the gain factor of the brake booster.

A brake system is further known from DE 10 2013 210 563 A1, in the case of which the pressure build-up and the pressure reduction is regulated in the brake boost operation by means of an electromotively driven piston. During the ABS operation, a constant primary pressure is set via a piston, the pressure in the wheel brakes being regulated with the aid of inlet and outlet valves via time control/PWM control.

For other hydraulic systems (e.g. clutch and gear actuators), a volume flow is controlled via proportional valves with variable opening cross-section, the pressure being made available via a pump and a high-pressure storage device.

A further brake system is previously known from EP 1874602, in the case of which the brake pressure in the wheel brakes is regulated by means of multiplex pressure regulation, in which the pressure is regulated via an adjustable piston and a switch valve assigned to each wheel via a pressure volume characteristic curve and displacement control of the piston.

A further brake system with multiplex regulation is previously known from DE 102011085273. In the case of these brake systems, the switch valve assigned to the respective wheel brake is opened for pressure build-up and pressure reduction and the pressure varies via the displacement control of the piston taking into account the pressure displacement characteristic curve, the piston being moved forwards by a predetermined distance for the pressure build-up and the piston being moved backwards by a predetermined distance for the pressure reduction. The respective valve is closed after the actual pressure has been reached. The pressures in the different wheels are regulated consecutively in a short time sequence or also regulated partly simultaneously. In the case of this method, the pressure piston or the position-regulated pressure piston is also the actuator for the pressure regulation.

Advantageous in the case of this regulating method is the high pressure control accuracy and the pressure regulation in the closed brake circuit, i.e. the brake circuit is not connected via an opened valve to the reservoir. This method also sets low requirements for the tolerances of the switch valves. What is disadvantageous are the high requirements on the dynamics of the adjusting drive of the piston and the large opening cross-sections and opening pressure strength of the switch valves.

A double stroke piston unit is previously known from PCT/EP 2014/069723, which builds up and reduces the pressure in one or both brake circuits in the forward stroke and return stroke with minimal time interruption or continuously delivers volume and also enables a switchover of hydraulically effective surfaces in the forward and return stroke via a switch valve. This solution is not only suitable for brake systems, but also for all hydraulic systems which require a pressure source, e.g. transmission and clutch controllers. For all these systems, a leak tightness diagnostic and flow resistance must be carried out continuously in the system.

DE 102011081240 A1 shows a brake-by-wire brake system, which describes a method for monitoring (diagnosing) the brake system. In the case of diagnosing a leak, the pressure is measured repeatedly with a constant piston position. The measured measurement value pairs (pressure-piston position) are compared with a characteristic diagram. If the measurement value pair is outside the permitted range, this is identified as a leak. A so-called system rigidity is determined with the measurement values. This is well suited for determining the ventilation of hydraulic circuits. However, it is not known from DE 102011081240 A1 how to measure the actual leak, i.e. the temporal variation of the pressure or adjustment of the piston. With a third measurand, the pressure of the main cylinder is measured and with the fourth measurand, the pedal displacement is measured and compared with a further characteristic diagram. This is common in brake-by-wire systems since in the case of an implausibility here, an error notification is provided owing to e.g. danger of pedal failure or leakage of the displacement simulator and switching to a fall-back level takes place with shutdown of the pressure supply arrangement (brake booster). A method for the overall diagnostic e.g. of the valves and the brake circuits is also not known from DE 102011081240 A1.

DE 102012201535 A1 describes a brake system, which enables hydraulic tests, e.g. discharge of pressure medium from an actuation unit (leak tightness or leakage). In this case, only one part of the entire brake system can be tested and controllable means in the form of valves are also required for testing. The test for leakage is carried out by pressure medium volume delivery of the controllable pressure source.

In the near future, systems for autonomous driving will be used, whose safety requirements are particularly high since any error that occurs could have fatal consequences. The so-called hidden faults are particularly critical here. Hidden faults are for example: Leakage flow from seals, which are difficult to identify in the case of low pressure or dirt particles in valves, which, if not identified, can lead to critical faults such as failure of a brake circuit during the next braking operation. In the case of other systems, e.g. clutch actuations, an interruption of the actuation speed of the actuating intervention is critical, which can be measured via the flow speed of the pressure supply.

The battery status must also be tested here since the brake force actuator cannot fail during braking operation. A short stress test with higher current strength is known for battery diagnostics.

Object of the Invention

The object of the invention is to provide a diagnostic method for at least one component of a vehicle.

Solution of the Object

The object of the invention may be achieved by a diagnostic method as set forth in the various appended claims.

Advantageously, the entire hydraulic system including the battery status for supplying the electric pressure source can be monitored with the diagnostic method according to the invention. In this case, all essential components, such as e.g. valves, seals, can be tested for leakage and malfunction.

The diagnostic method according to the invention is advantageously characterised in that it manages with few sensors. In the case of the diagnostic via the measurement of the piston position, an accurate measurement of the volume of undesired outflowing hydraulic medium is carried out. In this case, a pressure measurement in the hydraulic circuit can be dispensed with, which often leads to incorrect results due to the pressure fluctuations that occur. The flow speed, also referred to as the leakage rate, can also advantageously be determined whereby the diagnostic can be used for the most varied of components of the vehicle.

By means of the control unit, either the size of the piston movement and/or the temporal change of the piston position of the piston can therefore be measured during the diagnostic method, the size of the piston movement and/or the temporal change of the piston position being taken into account for assessing the variation and/or functioning of the component.

However, it is also advantageously possible for the control unit to adjust the piston by a predetermined distance and thereby simultaneously measure the pressure generated by the pressure supply unit and/or the current flowing through the electromotive drive in order to determine the flow resistance in the component or a part thereof.

The diagnostic method can also advantageously measure the temporal variation of the pressure in the case of a piston that is stationary for a predetermined time, the measured temporal variation of the pressure being taken into account for assessing the variation and/or functioning of the component or the leakage rate being determined directly. The leakage rate is understood in the sense of the invention as the volume change per time (dV/dt) or the pressure change per time (dp/dt). Leakage rates of different sizes can be allowed for each vehicle component.

As already mentioned, the leakage rate dv/dt or dp/dt can be determined with the diagnostic method according to the invention and a corresponding output signal or message can be generated on the basis of the determined leakage rate. Corresponding troubleshooting can hereby be carried out e.g. before the failure of a system. The control unit can thus e.g. determine the functioning or leak tightness of the component as soon as the piston movement exceeds a threshold value. The threshold value can e.g. be dependent upon the set or regulated motor current or pressure in the hydraulic circuit.

Advantageously, the control unit can carry out the diagnostic method for a plurality of components of the vehicle in a time delayed manner, a separate maximum permissible leakage rate being assigned to each component.

A possible component of the vehicle may be the brake system or a part of the brake system, in particular a valve or the piston cylinder unit itself or its electromotive drive, a hydraulically operating clutch or the vehicle battery.

In the case of a first preferred embodiment of the diagnostic method, the control unit, during the diagnostic method, measures the size of the adjustment of the piston in the case of constant motor current flowing through the drive and then determines the leak tightness and/or functioning, in particular the leakage rate of the component or one of its parts on the basis of the measured adjustment of the piston, in particular evaluating the pressure-volume characteristic curve of the component.

By measuring the motor current (phase current or battery current), a pressure measurement and therefore the pressure sensor otherwise required for such purpose can advantageously be dispensed with. Any inaccuracy in deriving the piston force or the pressure generated by means thereof from the motor current can be improved by using a characteristic diagram. The characteristics diagram can also advantageously take into account the following relationships and parameters: motor current, friction in the drive, adjustment speed of the piston, piston acceleration or rotational acceleration of the rotor. The characteristics diagram can also be used for all pressure control operations and regulation operations, such as e.g. in the case of pressure build-up and pressure reduction and ABS functions.

In the case of a second preferred embodiment of the diagnostic method, the control unit, during the diagnostic method, regulates a constant pressure in the component by means of the pressure supply unit and a pressure measurement in the component and in this case determines the size of the adjustment of the piston in order to then determine the leak tightness and/or functioning, in particular the leakage rate of the component or one of its parts on the basis of the adjustment of the piston, in particular evaluating the pressure-volume characteristic curve of the component.

Insofar as the brake system is checked by means of the diagnostic method, the control unit can thus take into account the pressure/volume characteristic curve of the brake circuit and/or wheel brake during the diagnosis.

Insofar as the brake system of the vehicle should be checked, the diagnostic method is advantageously carried out towards the end of braking, after the end of braking or during a vehicle standstill. Insofar as the diagnostic method should be carried out while the vehicle is driving, this can only occur in a time frame in which braking will not be carried out or will most likely not be carried out. The control unit must therefore check the driving status and the vehicle status of the vehicle prior to initiating the diagnostic process. For the diagnostic method, the pressure already set or regulated in the component, in particular in the brake circuit can advantageously be used.

In the case of the diagnostic, a significant impairment to the service life of the components should be avoided as far as possible, accordingly, the above-mentioned diagnostic must be tailored to the respective component. It lends itself in particular here to use the operating pressure, e.g. the available brake pressure. This is particularly advantageous when the brake pressure available during a vehicle standstill is used for the diagnostic.

Insofar as the pressure supply device has been isolated from the other components of the vehicle by means of the available valve, the drive motor of the piston can be loaded in a special test cycle, the battery also being able to be loaded briefly with higher current and therefore tested. As is well known, an excessively large voltage drop is in this case an indicator for a battery defect.

It is also significant that the diagnosis of the leak tightness must be carried out in a short time and be accurate since the time available is short during a vehicle standstill, as e.g. in the case of stop and go.

As is well known, the failure probability (AW) is generally related to a year, primarily defined with ppm ($10^{-6}$). A vehicle is currently defined with $200 \times 10^3$ braking operations/year. A leak tightness failure of 1 ppm is assumed. If a diagnostic is carried out for each braking operation, a failure probability of $$AW = 5 \times 10^{-6} = \frac{1}{200 \times 10^3}$$

of 1 ppm=$5 \times 10^{-6} \times 10^{-6} = 5 \times 10^{-12}$ during a braking operation would thus result. The failure risk would therefore be minimal. The significance of the active diagnostic in short time intervals thus lies:

- in the significantly lower failure probability and therefore early detection also of beginning failures, see above-mentioned example; instead of 1 ppm=$10^{-6}$, with a diagnostic $6 \times 10^{-12}$, virtually a factor of 1 million. It can be deduced therefrom that it is sufficient for the test to be carried out e.g. after only every fiftieth braking operation, e.g. in the case of vehicle standstill.
- The detection of critical e.g. hidden faults even before the next braking operation.
- The variability e.g. of diagnostic cycle in the test scope and application e.g. during the function, towards the end of the function, vehicle standstill, in some cases only in the service interval.

A measurand for leak tightness is the temporal pressure change of a shut-off volume with a high-resolution pressure transducer or alternatively the temporal volume change via piston displacement measurement in the case of constant pressure or current of the electric motor of the pressure source. In this case, pressure or current must only be approximately constant in the test cycle since both measured influencing factors are factored into the volume change. According to the invention, it is proposed to identify the leak tightness of a system in a plurality of diagnostic cycles, e.g. 1. hydraulic circuit, 2. valves, 3. pressure chambers, 4. seal, 5. pressure supply. Furthermore, the volume change by a piston displacement change should be used as the measurand in the case of constant pressure or current. The measurement of the volume change is essentially more accurate and does not require any high-resolution pressure transducer whose measurement is influenced by pressure fluctuations in the system. The temporal volume measurement can also be used to determine the flow resistance. Lastly, in some of the above-mentioned test cycles, the volume measurement can also be combined with the pressure measurement. In order to diagnose the voltage drop at the battery and therefore the battery itself with a short-term, higher current load, all valves to the main and the wheel cylinders are closed.

The advantages of the invention are shown for two systems with simple plunger and double stroke piston, which are both actuated by a spindle or ball screw drive. Alternatively, however, other drives can also be used.

In the case of the former, the piston actuates different actuating cylinders (plungers) via isolation valves which cause an actuating intervention e.g. clutch actuation. In this case, the diagnostic identifies the leak tightness of the hydraulic circuits, valves, seals, temporal volume delivery of the pressure supply and the flow resistance including the status of the battery.

The second, more complex system corresponds to a brake system which is previously known e.g. from DE 10 2014 109 384. It has a double stroke piston and tandem main cylinder with five different pressure chambers, various valves and seals. This system is suitable for autonomous driving due to redundant brake circuits, corresponding valve circuits and redundant coil (2×3 phase).

In summary, the following focus points are included:
- Diagnostic of the leak tightness, flow resistance and battery in the entire brake system by measuring the temporal variation of pressure, piston displacement, battery voltage.
- Different diagnostic cycles for individual regions and components of a hydraulic system.
- Leak tightness test during each braking operation by comparing with the pressure-volume characteristic curve.

DESCRIPTION OF THE FIGURES

In the drawings:

FIG. 1 shows a single-circuit pressure supplier with motor 9, which linearly drives a piston 18 with seal D6 via a spindle drive 10. The pressure results in the pressure chamber D and is measured via the pressure transducer 15. The piston stroke $S_K$ is for example measured via the motor sensor 8a, which in particular identifies the rotational angle of the motor. The hydraulic volume is delivered corresponding to the target values either via the isolation valve TV1 or via TV2 into the hydraulic circuits HLa and HLb. FIG. 1 corresponds e.g. to a transmission controller with the hydraulic circuits HLa and HLb, actuating cylinders 16a and 16b, which cause an actuating intervention 17, e.g. clutch actuation. Piston 18 is moved back to disengage. In this example, HLa and HLb are closed hydraulic circuits. The pressure can be reduced ($P_{reduction}$) irrespective of the $P_{build-up}$ in a hydraulic circuit by additional drain valves (not portrayed) with connection to the reservoir VB.

In the case where hydraulic medium is drained into the reservoir VB via an outlet valve, corresponding volume is lacking in the pressure chamber D in the case of a return movement of the piston 18. This can be supplemented again by the suction valve SV. The motor is connected to the battery via a shunt for the voltage measurement V. The phase current is measured in the motor by the sensor 8b. The battery current can be measured via an additional resistor. In addition, the temperature of the motor or in the pressure chamber can be measured with the sensor 8c. Instead of the battery current, the phase current can also be measured in the motor.

Figure 1:
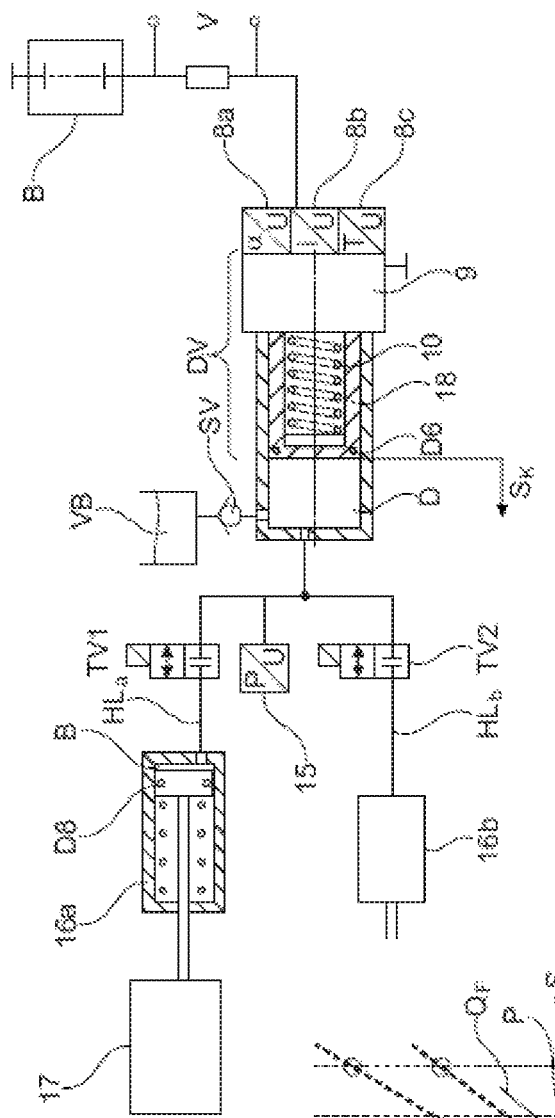
FIG. 1: shows a simple system with single-circuit pressure supplier and a piston with two hydraulic circuits HK a and HK b.
Figure 1A:
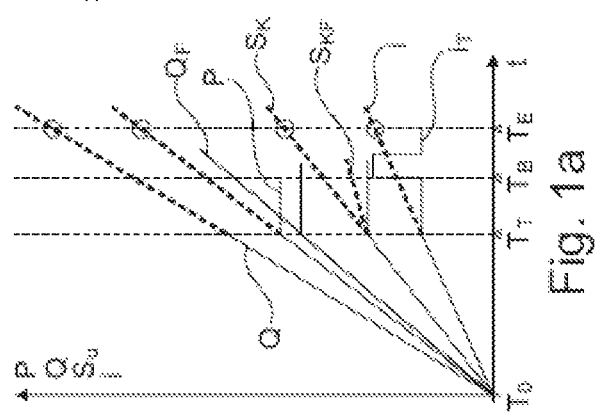
FIG. 1a: shows the temporal course of different measurands with a single test cycle after $T_T$.

FIG. 1a shows the temporal course of the essential measurands, pressure P, flow rate Q, piston stroke $S_K$ and current I. At the time $T_T$, the diagnostic method according to the invention is carried out, the valves TV1 and TV2 being closed and the piston stroke not being increased further. The motor current I is also not increased further such that the pressure should remain at the set value. If the piston now moves in the case of constant pressure or current, this is an indicator that there is a leak in the pressure chamber D and/or in the hydraulic lines or the valves TV1 and TV2. The leakage flow, even if it is small, can easily be determined via the piston displacement change. If there is already a leak between $T_0$ and $T_T$, the delivered volume and the pressure can be compared and evaluated with the pressure-volume characteristic curve of the hydraulic circuit HLa or HLb activated by the piston volume. The flow resistance can also be measured in the system. If e.g. there is a dirt particle in the switch valve TV1 or a hydraulic line, or there is increased piston friction or an interruption in the actuating drive, this becomes noticeable in an increased pressure compared with the pressure-volume characteristic curve.

At the time Tb, the valves TV1 and TV2 are briefly closed, whereby the pressure is increased, which causes a current increase in the motor with corresponding actuation. If the voltage drop at the battery is too high due to the current increase, the battery is thus defective and can then be examined in more detail during a service. At the time Te, the manipulated variable is at the maximum.

Figure 2:
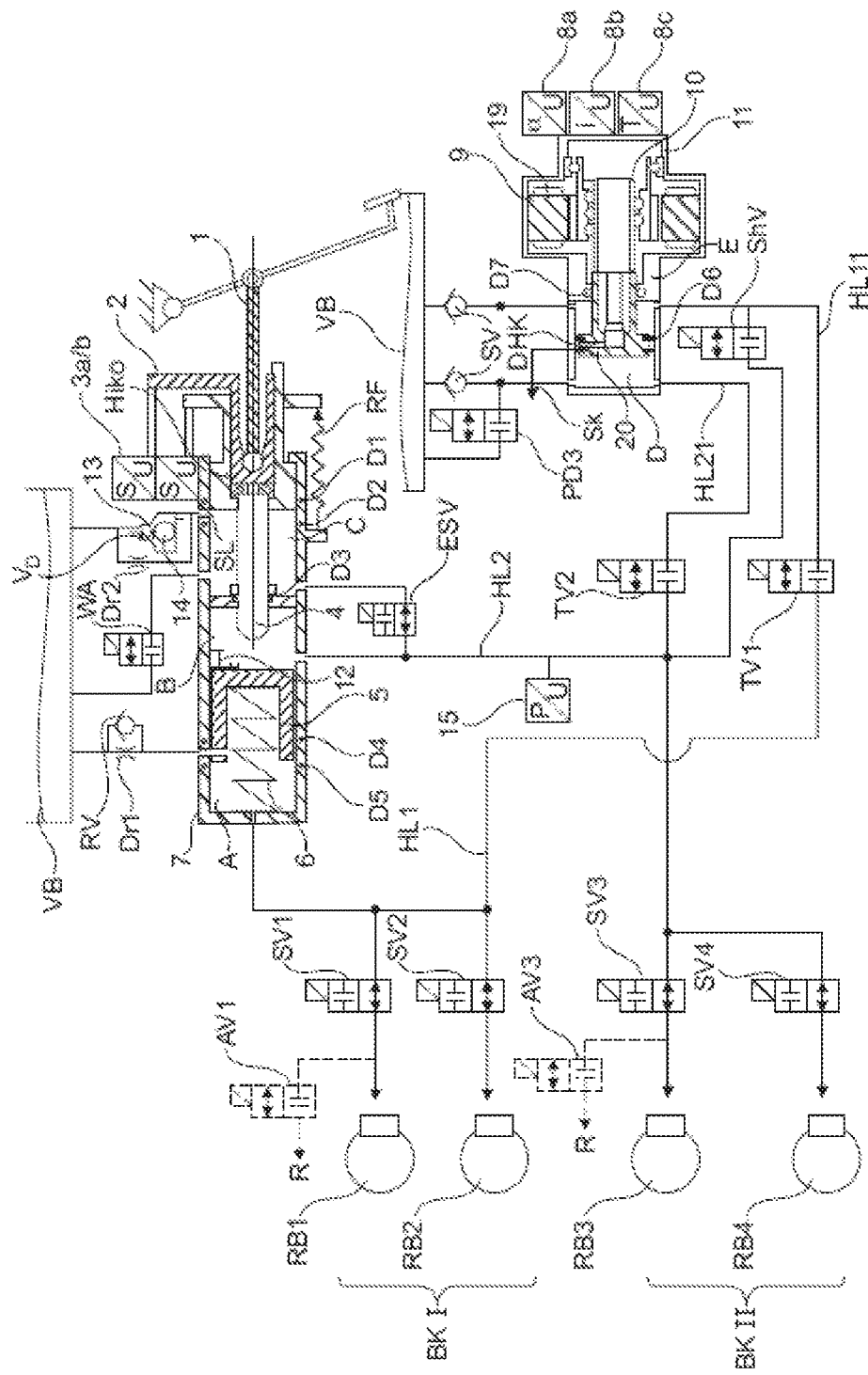
FIG. 2: shows a complex brake system with dual-circuit pressure supplier and a plurality of hydraulic circuits and tandem main cylinder.

FIG. 2 shows a complex two-circuit brake system with two-circuit pressure supply with double stroke piston. This system is described in detail in DE 102014117726 A1. The following description also includes the main faults and the basis for the diagnosis. This system can be used for autonomous driving (AF). The system consists of three main components, the tandem main cylinder THZ with three pressure chambers A, B, C and two pistons 5 and auxiliary piston with plunger 4, a pressure supply with double stroke piston and two pressure chambers D and E, the motor 9 and stator with redundant stator coil (2×3 phase) and sensors 8a-8c which are also redundant in the case of the above-mentioned redundancy of the coil, and the temperature sensor 3. The brake system also has a valve circuit for the pressure regulation of ABS, outlet valves AV1, AV3, switch valves SV1-SV4, the controller of the pressure supply with isolation valve TV 1/2, the bypass valve ShV and the outlet valve PD3, suction valves SV 1/2 and also the controller of THZ with displacement simulator via feed valve ESV and displacement simulator shut-off valve WA. All valves are combined in a valve block to form the so-called hydraulic unit HCU, said hydraulic unit having outputs to connect to the wheel brakes RB1-RB4. The pistons are sealed with seals D1-D7. The pressure chambers A and C are connected to the reservoir via throttles DR to check valves RV and flow-dependent switch valve. All valves and seals are subject to faults and signify a failure of function or of the brake circuit in the case of malfunction. A failure of the brake circuit and the pressure supply is critical e.g. in the case of autonomous driving, which is also not permissible. In the case of seals, a distinction is made between small leaks or complete failure, in particular in the case of higher pressures, with significant leakage flow.

In the case of the valves used, there is the risk that in spite of the filter in the inlet and outlet, dirt can settle in the valve seat when there is flow, which can cause failure of the valve function. The case e.g. of an outlet valve AV 1/2 is critical, in the case of which a flow can take place due to dirt particles. If this cannot be identified by a diagnostic at the end of braking operation, the brake circuit can fail during the next braking operation. This is an example of a hidden fault. The piston can jam or become sluggish due to dirt or wear or tilting, which is identified by the diagnostic method according to the invention.

All these faults should be identified in a diagnostic. The effectiveness of the diagnostic at reducing the failure probability AW has already been explained.

Some typical faults with their impact are explained below:
Failure D1: Auxiliary piston, seal failure D1 has leakage in the footwell as a result, therefore not critical to safety since the level sensor in the reservoir VB reacts.
Diagnostic D o.k. (should mean: it is fully tested during the diagnostic cycle.
Failure D2: causes pedal plunger failure; is identified by pedal displacement sensors, diagnosis of leak tightness not possible, only during service. Not relevant for autonomous driving. A solution is now integrated here with RV/DR and VD/DR, which strongly reduces the pedal failure in the case of failure of the seal D2 due to the installation of the throttle DR. The throttle normally has only the task of balancing out pressure during a temperature change. These can therefore be designed for low flow rates, e.g. 0.3 cm$^3$/s. The throttle (Dr) is dimensioned for the case of the fall-back level for failure of the pressure supply, e.g. motor. Due to the throttle, a volume loss can e.g. occur in the THZ in the case of a braking operation of 100 km/h and 60 bar=0.6 g of approx. 20%, which still allows high braking and is therefore non-critical to faults. This leakage volume can also be easily identified during the diagnostic. A higher leakage volume then corresponds to a seal failure.

A special configuration of the throttle is the flow-dependent switch valve. This constitutes a check valve, which closes in the case of greater flow volumes, e.g. during the diagnostic. This solution with different flow volumes is not advantageous in the case of a fault, e.g. failure of the pressure supply during the braking operation, e.g. electrical system failure. The volume then has to flow out of the brake circuits via the RV without significant time delay if the pedal and the auxiliary piston are located in the starting position. In the case of the flow-dependent switch valve, this takes place significantly faster than with the throttle due to the larger cross-section.

Failure D3 causes volume V to flow from pressure chamber B into V during normal braking operation since a corresponding pressure difference is present and the displacement simulator shut-off valve WA is open. A failure is identified by additional volume delivery of the pressure supply in the diagnostic during the operation via the pressure-volume characteristic curve (p-V characteristic curve). Also in the special diagnostic cycle, see FIG. 3.

Failure D4 of SK piston 5—failure is prevented by throttle 1 as in the case of the auxiliary piston. Diagnostic o.k., if in the seal D4 leakage flow>leakage flow from throttle.

In the case of seals 4 and 5 during normal operation and during autonomous driving, a leakage has no impact since it amounts to less than 1% of the pressure supply delivery volume. Instead of throttle DR1, a magnetic valve MV can also be used, which would, however, be associated with a significant additional effort. The DR/RV is a simple possibility to reduce the impact of the failure of the seal. The seals D6 (twice) and D7 are designed for a two-circuit, i.e. redundant pressure supply. With D6, two seals are designated with leakage channel located therebetween. In the case of failure of a pressure chamber D or E, the redundancy is provided by the double stroke piston. In the case of failure D or the corresponding brake circuit, only a reduced delivery volume is still present due to the smaller piston surface, which is, however, still sufficient. In the case of failure of the brake circuit, the second circuit is also always available.

The leakage of the double stroke piston DHK or leakage of one of the seals D6, D7 results in a loss in the volume delivery which is identified through the comparison with the pressure-volume characteristic curve. An increase of the flow resistance is also identified.

The failure of the pressure transducer is identified by plausibility via the measured motor current.

The valve failure of the isolation valve (leakage) TV1/2 with bypass valve ShV is identified during normal functioning via the pressure/volume characteristic curve of the pressure supply. An additional special diagnostic can take place in the test cycle. The malfunction of one of the switch valves SV1-4 including the outlet valves AV1, AV3 is identified in the case of ABS or ESP operation or during a diagnostic cycle. The ESV failure, like D3, also causes the failure of the displacement simulator shut-off valve.

A brake circuit failure can occur inside the hydraulic unit die leaking valves or pressure transducers or seals for the THZ, not portrayed. These failures are rare and have a low failure probability. In addition, the leaks outside of the hydraulic unit are significantly greater. The hydraulic connections from the wheel cylinders to the HCU and intermediate parts of line to the brake hose and also wheel cylinder with corresponding seals are affected here. These elements have a significantly higher failure probability. Their failure can be identified by the pressure-volume characteristic curve of the pressure supply and subsequent closure of the SV. After opening the valve SV, the failure of the wheel line can in turn be identified via the pressure-volume characteristic curve. In the case of failure of a wheel line, braking can be carried out better via a brake system with partial failure BK and three wheel cylinders than with two corresponding to a full brake force failure. The diagnostic with logical detection of the leak-prone wheel circuit takes place during the braking operation and requires a delay time for the $P_{build-up}$ of the intact wheel cylinder lines.

SUMMARY

All fault-prone components are partially monitored during the active actuation of the brakes in the case of pressure build-up $P_{build-up}$ (Test I) by functional diagnostic, comparison with p-v characteristic curve or also by switching the valves or tested in the special diagnostic cycle, e.g. in the case of a vehicle standstill. The leak tightness, the flow resistance and switching on/off of the valves is therefore identified in a relatively short time interval. It is significant that the two-circuit pressure supply with redundant stator coil and corresponding actuation prevents simultaneous failure of brake circuit and pressure supply.

The listed hidden faults can also be advantageously prevented.

Figure 3:
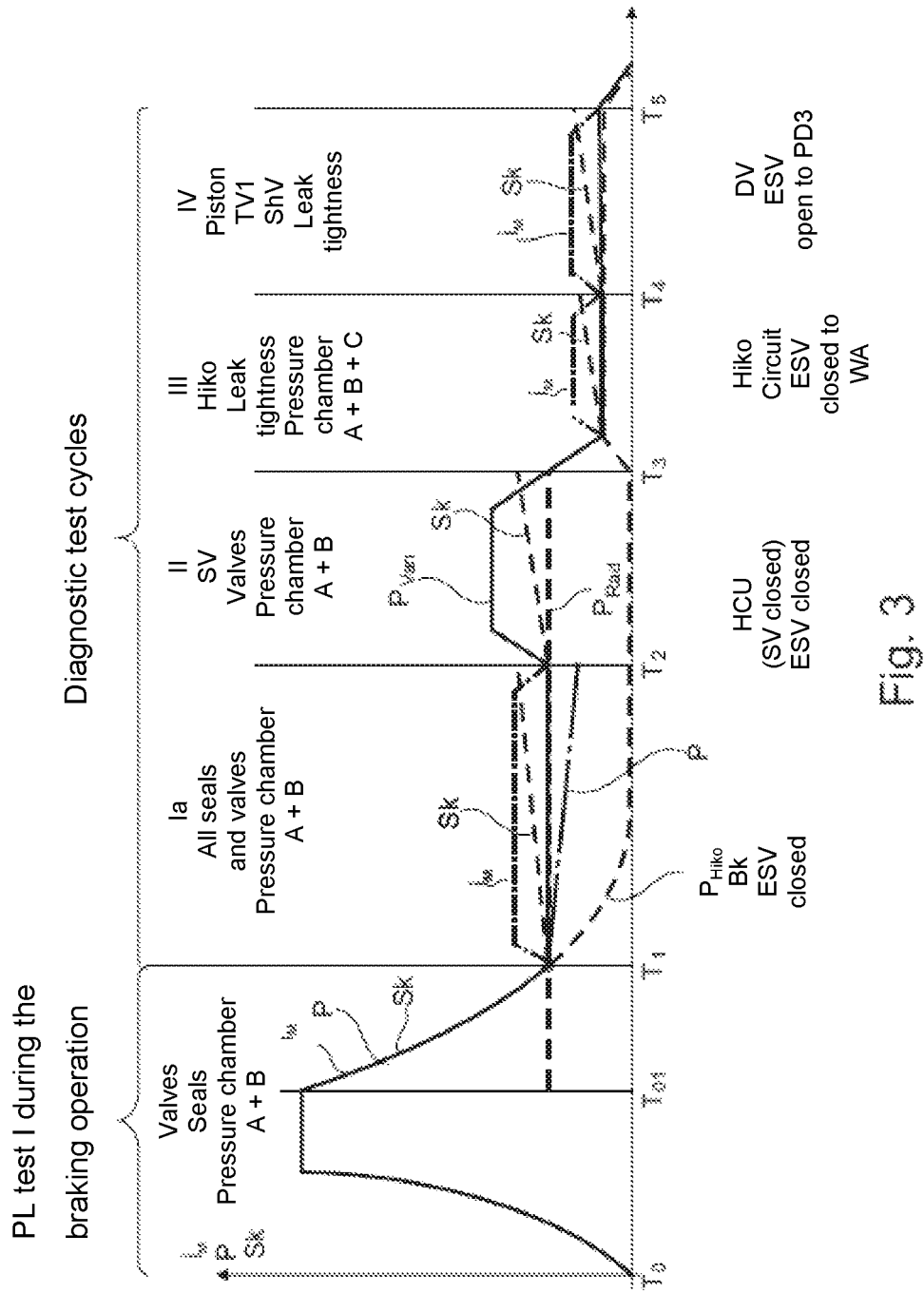
FIG. 3: shows a temporal course of the diagnostic with different diagnostic cycles.

FIG. 3 shows the time sequence of possible diagnostic cycles in a simplified manner. The diagnostic cycles are used here after pressure reduction $P_{reduction}$ to approx. 10-20 bar in the case of a cycle I, $T_{01}$–$T_1$.

In this phase $T_0$ to $T_{01}$, the volume uptake with associated pressure is essentially evaluated in a plausibility test based on the pressure-volume characteristic curve (P-V) or also characteristic diagram. The result shows the ventilation of all hydraulic circuits, in the case of temporal change of the p-V characteristic curve also leaks with more significant leakages. An advantage of a brake-by-wire system is that smaller leakages are compensated by the pressure source. The smaller leakages are identified in the following test cycles. They are relevant for the fall-back level if the pressure source fails since it would be a traffic hazard in the case of an leaking brake circuit.

The diagnostic cycle I identifies, after T1, the leak tightness in the pressure chamber A and B and of the seals in the two brake circuits. In this case, the feed valve ESV is closed such that the auxiliary piston circuit is separated. The pressure in the auxiliary piston circuit therefore moves towards 0 corresponding to the pedal movement. The leak tightness is now measured via the pressure drop or preferably via the piston movement SK. In this case, the current is preferably increased by 10-20% in order to compensate the friction on the piston and the ball screw drive KGT. The current regulation with current measurement can be improved further by the control of the current being taken from a characteristic diagram, by for example the associations of the parameters motor current, friction, piston adjustment speed and/or piston acceleration or rotational acceleration of the anchor being identified. The temporal piston movement in the case of constant current or constant pressure is a measurement for the leak tightness or leakage flow QI.

The diagnostic cycle II takes place after $T_2$. In this case, it is important for the corresponding wheel circuit to be separated via the corresponding SV valve. This is necessary to avoid hidden faults. The pressure is increased slightly here via the pressure supply, by approx. 5 bar such that a pressure difference to the wheel pressures occurs. The measurement of the leak tightness of the switch valves SV is carried out as in the case of diagnostic cycle Ia via measurement of the pressure change or the piston position SK.

The diagnostic cycle III begins at $T_3$ and identifies the leak tightness of the auxiliary piston HiKo in the circuit C. To this end, the feed valve is opened, whereby the pressure in the pressure chamber A and B is reduced by the small volume uptake in the pressure chamber C. A small volume change, not represented, takes place here by the leakage flow QD, by way of the throttle DR2 since in the starting position of the auxiliary piston the breather hole is open and there is therefore a connection to the reservoir VB. The same also applies for the diagnostic cycle I. A larger leak than QD is identified. If, instead of Dr1/RV, the flow-dependent switch valve is to be used, a corresponding delivery volume must be briefly delivered via the pressure supply to close VD. (not portrayed in the simplified representation).

The diagnostic cycle IV begins at $T_4$, and identifies the leak tightness of each isolation valve TV1 and the bypass valve ShV. To this end, the double stroke piston is moved slowly, the valve P03 being open at the same time such that negative pressure results in the pressure chamber E. In the case of a leak, a pressure change occurs in the pressure chambers A-C.

These diagnostic cycles can be expanded with special cycles to test specific components. The cycles can also be ordered in the vehicle stop CSC, park stop PSC or service, depending on the risk and fault safety.

LIST OF REFERENCE NUMERALS

1 Pedal plunger
2 Piston plate 3 a/b pedal displacement sensors
4 Plunger
5 SK piston
6 Piston return spring
7 THZ housing
8a Motor sensor
8b Motor current sensor
8c Temperature sensor
9 Motor
10 Spindle
11 Housing
12 SK maximum
13 Ball of check valve
14 Return spring
15 Pressure transducer
16 Positioning cylinder
16a Positioning cylinder
17 Actuating intervention
18 Plunger piston
19 Stator with 2×3-phase coil
20 Leakage channel
A,B,C Pressure chambers
AV ⅓ outlet valves
AF autonomous driving
B Battery
BK I-II brake circuits
D1-D8 Seals
DHK Double stroke piston
DR1 Throttle 1
DR2 Throttle 2
DV Pressure supply
ESV Feed valve
HCU Hydraulic unit
HiKo Auxiliary piston
HL 1/2 Hydraulic line brake circuit 1 and 2
HL 11/12 Hydraulic line of the pressure supply
$P_{build-up}$ Pressure build-up
$P_{reduction}$ Pressure reduction
PD3 Outlet valve
RB 1-4 Wheel brake
RF Return spring
ShV Bypass valve
Sik Safety-critical
SK Piston movement
SV 1-4 Switch valve
SV Suction valve
TV 1/2 Isolation valve
V Voltage
VB Reservoir
VD flow-dependent switch valve
WA Displacement simulator shut-off valve

What is claimed is:

1. A diagnostic method to determine leak-tightness of at least one seal and/or one valve, for at least one component of a vehicle, wherein a piston cylinder unit, whose piston is driven by an electromotive drive, forms a pressure supply unit, wherein a control unit is able to identify piston position and/or piston movement of the piston by means of at least one first sensor and is further able to identify a pressure generated by the pressure supply unit or a motor current flowing through the electromotive drive by means of at least one second sensor, the method comprising one of the following:

measuring a size of the piston movement and/or a temporal
change of the piston position of the piston in a case of constant
or approximately constant drive force of the electromotive drive, and taking into account the size of the piston movement and/or the temporal change of the piston position to assess variation and/or functioning of the component;

adjusting the piston by a predetermined distance and simultaneously measuring the pressure generated by the pressure supply unit and/or the motor current flowing through the electromotive drive in order to determine flow resistance in the component or a part thereof; or measuring temporal variation of the pressure generated by the pressure supply unit in the case of a stationary piston, and taking into account the measured temporal variation of the pressure to assess variation and/or functioning of the component;

wherein the diagnostic method further comprises:
performing, by the control unit, the diagnostic method while the vehicle is driving,
insofar as a braking operation does not have to be carried out for the duration of the diagnostic method, wherein the control unit tests the driving status and the vehicle status of the vehicle prior to initiating the diagnostic method, and/or performing the diagnostic method during a time interval during a regular operation of the component to be diagnosed, during normal operation of the vehicle.

2. The diagnostic method according to claim 1, further wherein the measured piston movement of the piston, the measured temporal change of the piston movement of the piston or the temporal variation of the pressure serves as a measurement for a beginning or present variation and/or functioning of the component.

3. The diagnostic method according to claim 1, further wherein the diagnostic method includes determining a leakage rate and generating a corresponding output signal or message on the basis of the determined leakage rate.

4. The diagnostic method according to claim 3, further comprising carrying out, by the control unit, the diagnostic method for a plurality of components of the vehicle in a time delayed manner, wherein a separate maximum permissible leakage rate is assigned to each of the plurality of components.

5. The diagnostic method according to claim 1, further wherein the component of the vehicle is a brake system or a part of the brake system, the piston cylinder unit, the electromotive drive, a hydraulically operating clutch or a vehicle battery.

6. The diagnostic method according to claim 5, further wherein leak-tightness of the brake system is tested during a time interval during braking operation by comparing volume uptake corresponding to a determined pressure with a pressure-volume characteristic curve associated with the brake system.

7. The diagnostic method according to claim 1, further wherein the control unit, during the diagnostic method, measures the size of the piston movement in a case of constant motor current flowing through the electromotive drive and determines the leak-tightness and/or functioning of the component or one of its parts on the basis of the size of the piston movement, by comparing the measured size of the piston movement or one or more values derived from the measured size of the piston movement with a pressure-volume characteristic curve of the component.

8. The diagnostic method according to claim 7, further comprising boosting, by the control unit, the motor current by 10-30%, prior to performing said measuring the size of the piston movement, said adjusting the piston by the predetermined distance, or said measuring temporal variation of the pressure generated by the pressure supply unit, and maintaining the motor current constant while performing said measuring the size of the piston movement, said adjusting the piston by the predetermined distance, or said measuring temporal variation of the pressure generated by the pressure supply unit.

9. The diagnostic method according to claim 8, further wherein the control unit takes into account a pressure-volume characteristic curve of a brake circuit and/or wheel circuit during the diagnostic method.

10. The diagnostic method according to claim 8, further comprising the control unit determining a functioning or leak-tightness of the component, insofar as the size of the piston movement does not exceed a threshold value.

11. The diagnostic method according to claim 10, further wherein the threshold value is dependent upon the motor current.

12. The diagnostic method according to claim 1, further comprising regulating, by the control unit, during the diagnostic method, a constant pressure in the component by means of the pressure supply unit and a pressure measurement in the component, and wherein measuring the size of the piston movement and determining leak-tightness and/or functioning of the component or one of its parts is performed on the basis of the size of the piston movement, by evaluating a pressure-volume characteristic curve of the component.

13. The diagnostic method according to claim 1, further comprising, prior to said measuring the size of the piston movement, said adjusting the piston by the predetermined distance, or said measuring temporal variation of the pressure generated by the pressure supply unit: separating the pressure supply unit from other components of the vehicle by closing valves; activating the electromotive drive; and checking a status of a battery of the vehicle on the basis of a stress resulting from said separating the pressure supply unit and said activating the electromotive drive.

14. The diagnostic method according to claim 1, further wherein the diagnostic method is carried out substantially at the end of braking, after the end of braking or when the vehicle is at a standstill.

15. The diagnostic method according to claim 1, further wherein the component is a brake circuit, and wherein a pressure already set or regulated in the brake circuit is used for the diagnostic method.

16. The diagnostic method according to claim 1, further wherein a target value is taken from a current characteristic diagram to control and regulate the pressure supply unit via the motor current.

17. The diagnostic method according to claim 16, further wherein associations of the parameters of friction of the electromotive drive and/or friction of the piston, speed and/or acceleration of the piston and motor current are accounted for in the current characteristic diagram.

* * * * *